(12) United States Patent
Pan et al.

(10) Patent No.: US 7,157,107 B2
(45) Date of Patent: Jan. 2, 2007

(54) METHOD FOR PRODUCING EGGS WITH LOW CHOLESTEROL LEVEL

(76) Inventors: Tzu-Ming Pan, No. 129, Lane 210, Changcing Rd., Sijhih City, Taipei County (TW); Chih-Chieh Wang, No. 8, Lane 5, Chung-shan Rd., Funshan Kaushang (TW)

(*) Notice: Subject to any disclaimer, the term of this patent is extended or adjusted under 35 U.S.C. 154(b) by 212 days.

(21) Appl. No.: 10/756,327

(22) Filed: Jan. 14, 2004

(65) Prior Publication Data

US 2005/0153051 A1 Jul. 14, 2005

(51) Int. Cl.
*A61K 36/00* (2006.01)
(52) U.S. Cl. ........................................ 424/750
(58) Field of Classification Search ............... 424/750
See application file for complete search history.

(56) References Cited

U.S. PATENT DOCUMENTS 6,046,022 A * 4/2000 Zhang et al. ............... 435/41
6,156,351 A * 12/2000 Shapira ....................... 426/2
2003/0194394 A1 * 10/2003 Hong et al. ................ 424/93.3

OTHER PUBLICATIONS

Internet website www.sciencenews.org; "Cholesterol Medicine for Eggs?," Jul. 12, 2003; vol. 164, No. 2. (4 pages total).*

* cited by examiner

*Primary Examiner*—Christopher Tate
*Assistant Examiner*—S. B. McCormick-Ewoldt
(74) *Attorney, Agent, or Firm*—Anthony S. King; WPAT, P.C.

(57) ABSTRACT

The present invention relates to a process for producing eggs with low cholesterol level. Different concentrations of fermented red mold rice are added to hens feeds. The fermented red mold rice contains Monacolin K, which has an effect on reducing cholesterol level. The cholesterol level in eggs produced by the present process is much lower than that in eggs produced by the prior art process. Furthermore, the serum triglyceride of hens is reduced. People are paying more attention to health, thus lowering consumption of high cholesterol food. Since cholesterol in eggs accounts for more than 50% of daily take-up, consumption of egg can hardly increase. Therefore, low cholesterol eggs can not only be beneficial to the public's health, but also bears business advantage.

8 Claims, 2 Drawing Sheets

METHOD FOR PRODUCING EGGS WITH LOW CHOLESTEROL LEVEL

BACKGROUND OF THE INVENTION

1. Field of the Invention

This invention relates to a process for producing eggs with low cholesterol level, and in particular, to a process for producing eggs with low cholesterol level by adding fermented red mold rice to hens diet so as to reduce cholesterol level of eggs.

2. Description of the Prior Art

The relationship between cholesterol and atherosclerosis has long been concerned. Plasma total cholesterol and low-density lipoprotein (LDL) are closely related to atherosclerosis, and excessive concentration of these two materials may lead to coronary artery disease or cause death. Ordinary chicken eggs provide protein, vitamins, and lipids which contains high level cholesterol. Thus, eggs are considered as a high cholesterol food. America Heart Association recommended that the cholesterol take-up for each person should be limited within 300 mg each day, and the whole egg yolk take-up should be limited to 3–4 per week. People are paying more attention to health, thus lowering consumption of high cholesterol food. Since cholesterol in eggs accounts for more than 50% of daily take-up, consumption of egg can hardly increase. Therefore, low cholesterol eggs can not only be beneficial to the public's health, but also bears business advantage.

Egg cholesterol is first biosynthesized in the liver of laying hens and secreted into the plasma in the form of very low density lipoproteins (VLDL). VLDL are then transported to the ovary where they are bound and taken up by growing chicken oocytes via receptor-mediated endocytosis. Egg cholesterol has been shown to vary with species of bird, breed or strain, as well as age of fowl.

Egg cholesterol content can be altered by (1) genetic selection, such as upward direction method or selecting hen that produce low cholesterol eggs; (2) diet alteration, such as adding dietary fiber, sterol, saturated and polyunsaturated fatty acid, cupric sulfate pentahydrate, protein and essential amino acids, chia, or red microalga to laying hens feed; (3) using hypocholesterolemic agent, such as adding probucol, dichloroacetate, atorvastatin, lovastatin, simvastatin or tocotrienols to laying hens feed to regulate egg yolk cholesterol level. Of all the methods mentioned above, lovastatin (monacolin K) showed different result in lowering cholesterol level in eggs.

As far as reducing egg cholesterol concentration was concerned, Elkin and Rogler suggested that addition of 0.2407% lovastatin in feed for 9 days could decrease the amount of cholesterol by 13%. Elkin and Yan pointed out that addition of 0.03% or 0.06% lovastatin could lower egg cholesterol concentration by 4% or 7% (hens of 18 weeks old, and feed for 5 weeks). Mori et al. pointed out that addition of 0.0005% or 0.0015% lovastatin could lower egg cholesterol concentration by 7.5% or 12.7% (hens of 30 weeks old, and feed for 12 weeks). On the other hand, Luhman et al. argued that addition of 0.0035% lovastatin showed no significant decrease in egg cholesterol concentration (hens of 69 weeks old, feed for 5 weeks), and the lovastatin used would remain in hen liver. Sim and Bragg believed that the cholesterol concentration in serum should be reduced prior to the reduction of yolk cholesterol concentration. Therefore, reducing serum cholesterol by applying drugs seems to be the best approach to reduce yolk cholesterol. However, whether there is any drug residue remained in eggs also need to be considered.

*Monascus* species has been widely used on diet and folk remedy for thousand years in Asia. Secondary metabolites produced from *Monascus* species include: (1) pigment group; (2) anti-hypercholesterolemic agent such as monacolin K; (3) antioxidant ingredient. Endo discovered the more active methylated form of compactin known as monacolin K (lovastatin) in broths of *Monascus ruber*. Monacolin K may inhibit the activity of 3-hydroxy-3-methylglutaryl coenzyme A (HMG-CoA) reductase in cholesterol biosynthesis. In fact, *Monascus* species has been proved to inhibit cholesterol biosynthesis. Furthermore, some researches showed that atherosclerosis is not only correlated to cholesterol and LDL in blood, but also correlated to the oxidation of LDL. Chen et al. pointed out that antioxidant ability and cardiovascular diseases were closely related. As a matter of fact, production of monacolin K by *Monascus* species has been used as a functional dietary supplement to reduce cholesterol level in human body. To our knowledge, the effect of red mold rice on eggs has yet to be investigated in previous studies.

Taiwanese Patent Application No. 396022 discloses the addition of tea polyphenlol from extract or residue of green tea, black tea or oolong tea into hens feeds, whereby the eggs from the fowl have a reduced crude fat content, a reduced peroxide content, an enhanced Haugh unit value, an enhanced degree of transparency of egg white, an enhanced foam-forming ability, a pure white color when the eggs are beaten to form a foam and a pure white color egg white when the eggs are cooked.

In views of the above-described researches associated to inhibition of cholesterol biosynthesis by using metabolite of *Monascus* species, the applicant keeps on carving unflaggingly to develop a process for producing eggs with low cholesterol level according to the present invention through wholehearted experience and research.

SUMMARY OF THE INVENTION

A first object of the invention is to provide a process for producing eggs with low cholesterol level, in which red mold rice is added to hens diet so as to reduce cholesterol level of egg yolks.

A second object of the invention is to provide eggs with low cholesterol level, which is beneficial to the public's health and lowers consumption of high cholesterol food.

A third object of the invention is to provide a hens feed of laying hens so as to increase serum anti-oxidation of the laying hens.

A fourth object of the invention is to provide a hens feed of laying hens so as to reduce serum triglyceride of the laying hens.

The above objects of the present invention can be achieved by using a process for producing eggs with low cholesterol level. According to a process for fermenting red mold rice, a fermented red mold rice at a specific proportion into a basal diet. The hens were fed once every day and every night, and the drinking water was freely taken. The number of egg production was recorded everyday. Egg quality, laying performance and composition of eggs were measured. Statistic analyses were done on the obtained data.

Comparing with prior art, addition of appropriate amount of red mold rice in the feed diets can influence change of egg weight. There is no significant difference in egg production. The group feeding with 2.0% red mold rice showed the lightest egg weight, which was significantly different from that of other groups. Yolk weight had no significant difference across groups. Feed consumption increased by 2–8% as the content of red mold rice increased. Feed conversion increased by 6–14% depending on the red mold rice content.

The degree of reduction on egg cholesterol was varied with the content of red mold rice in the feed. The group fed with 2.0% red mold rice showed maximum reduction of cholesterol by 13.89%. The addition of 8.0% of red mold rice to the diet can significantly reduce LDL by 21%. The triglyceride is significantly reduced by about 20% when 5.0% red mold rice was incorporated to feed diets. All groups had significant difference in serum cholesterol, and the addition of 5.0% of red mold rice to the diet can significantly reduce serum cholesterol by 19.35%. It was also found that the red mold rice increases ratios of HDL over cholesterol and HDL over LDL. Based on the data, addition of red mold rice in feed diets did help on reducing egg cholesterol concentration. The determination of monacolin K in eggs indicated that the addition of red mold rice in feed diets was very safe.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
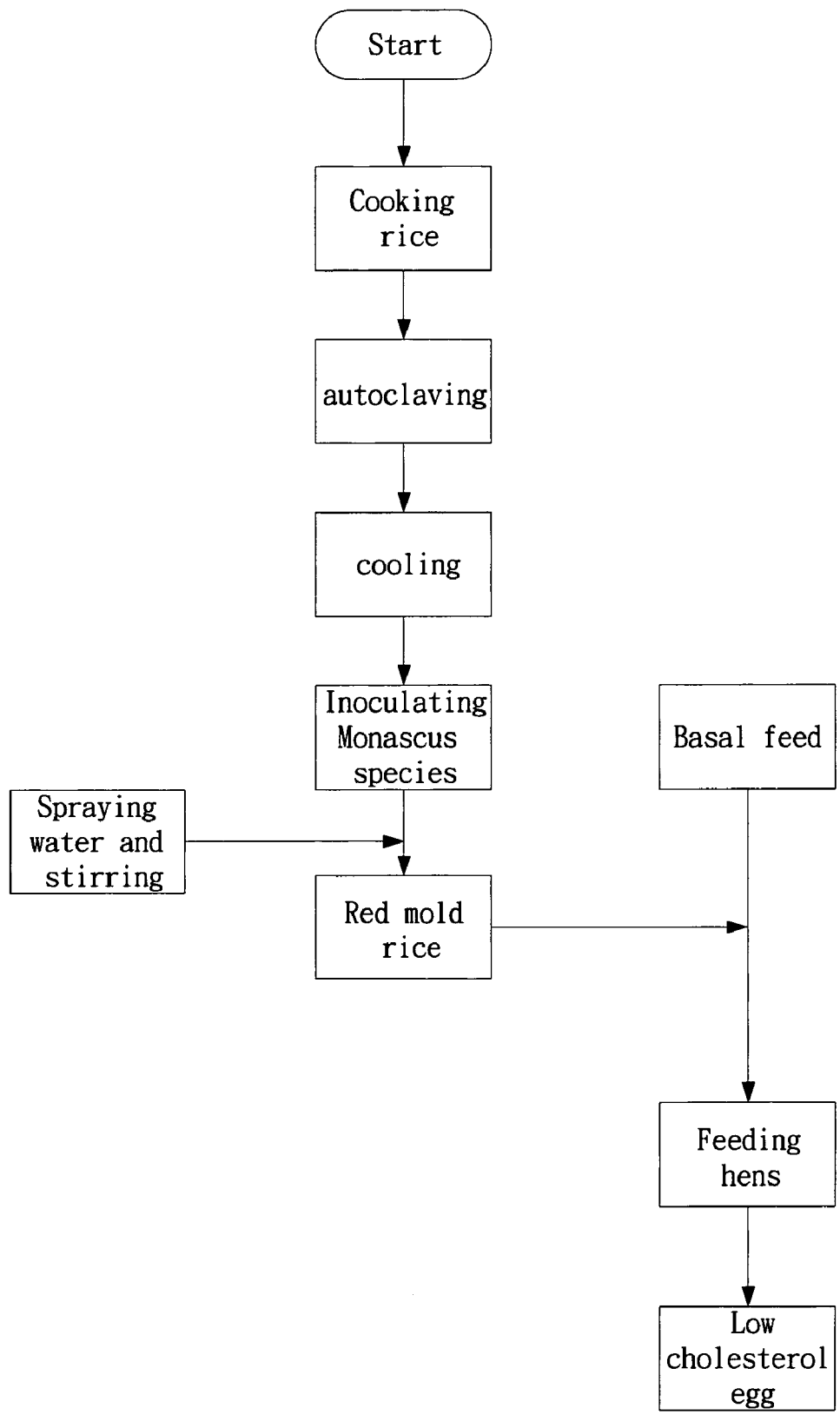
FIG. 1 is a flowchart illustrating a process for producing eggs with low cholesterol level according to the present invention.

Referring to the flowchart of FIG. 1, this embodiment employs Hy-line laying hens as subjects to investigate the effect of red mold rice supplementation with different concentration on egg quality, laying performance, serum cholesterol, serum triglyceride, HDL, LDL, serum lipid peroxidation and egg yolk cholesterol. This embodiment is performed as follows.

The screening for red mold rice production was carried using species of the genus *Monascus purpureus*. The *M. purpureus* was incubated on PDA (Potato Dextrose Agar) agar for 5 days. A loopful of spore from the PDA agar is transferred into a basal medium (100 g glucose, 10 g peptone, 2 g $KNO_3$, 2 g $NH_4H_2PO_4$, 0.5 g $MgSO_4 \cdot 7\ H_2O$, 0.1 g $CaCl_2$ made up in 1000 ml distilled water, pH 6.0). The cultures were incubated at 30° C. for 48 hours, ready for use.

Five hundred gram of commercially available long-grain rice was washed with distilled water to a non-muddy state and then soaked in distilled water for 8 hours. Then, excess water was removed with a sieve. The soaked rice was autoclaved for 15 min in a "koji-dish". After being cooled, the rice is sprayed with water, uniformly stirred, re-cooked for 15 min, removed and cooled down to 40° C., thereby completing the procedure of cooking rice. The substrate was inoculated with a 5% spore suspension of *M. purpureus*, uniformly stirred, and incubated in a koji-dish, which is made of wood with the dimension of 30×20×5 cm. During the incubation period, turning-over, first watering, second watering, final watering and post-ripening procedures are sequentially carried out, and the incubated substrate was cultivated at 30° C. for 10 days. The prepared mold rice was used as a supplement diet for hens feeds.

The *M. purpureus* incubated in the long-grain rice is sequentially dried, ground by a powder grinder, screened with an 80 mesh sieve, sealed in large-mouth jar and stored in a desiccating device.

The amount of monacolin K added to feed diet was determined according to the rate of biosynthesis and hens body weight. The weight of a normal laying hen is approximately 1.5–1.7 kg, and the rate of biosynthesis is 300 mg of cholesterol/day. However, a 70-kg adult can synthesize 800 mg of cholesterol/day. Thus, assuming the normal daily human dose at 40 mg, then the normal daily hen dose of monacolin K should be 15 mg of monacolin K per day (300×40/800). Since the feed diet of the laying hens is approximately 100 g per day, human equivalent dose is about 15 mg of monacolin K/100 g, or 0.015% monacolin K. The dose used in this embodiment was based on above reasoning, and 2.0%, 5.0%, 8.0% of red mold rice was incorporated into hens feed to reach 0.014%, 0.035%, and 0.056% of monacolin K, respectively, in order to study the effect of addition of red mold rice in hens diet on serum cholesterol, HDL, LDL and triglyceride concentration.

In this embodiment, 48 Hy-line laying hens of 48 weeks old were divided into 4 groups according to the types and the concentrations of the additives. Each group has 12 laying hens for experimentation. Except for the control group, the feed for three other groups contained 2.0%, 5.0% and 8.0% red mold rice. By an HPLC analysis, the monacolin K concentration for each group is 0.0145%, 0.035% and 0.056%, respectively.

The composition of the basal diet, which is principally composed of corn and soybean meal, is shown in Table 1. Except for the control group, the feed for three other groups contained 2.0%, 5.0% and 8% red mold rice containing monacolin K, thereby investigating its effect on reducing cholesterol level of egg produced.

The hens were housed in three-layer cages with 2 hens per cage. During this period, the hens were fed once every day and every night, the drinking water was freely taken. The number of egg production and the body weights of the laying hens were recorded everyday. Following analyses were measured weekly as well.

1. Laying Performance

Determination of egg production percentage—the total number of the egg production during the studied period divided by the number of hens and multiplied by 100, i.e.

Egg production (%)=(total number of the egg production per group/number of hens)×100

Determination of feed consumption—the feed amount consumed for each hen per day during the studied period (g/hen/day).

Determination of feed conversion—the consumed feed amount corresponded to 1 kg of laid egg during the studied period (kg food/kg egg).

Determination of egg weight—the total weight of egg production weekly divided by the total egg number during the studied period.

TABLE 1

Composition and calculated analysis of basal diets

| | Percent |
|---|---|
| Ingredient | |
| Corn | 56.8 |
| Soybean meal | 22.0 |
| Meat and bone meal | 3.0 |
| Fish meal | 1.0 |
| Corn gluten meal | 3.0 |
| Wheat bran | 3.0 |
| Limestone | 6.5 |
| Oyster | 2.0 |
| Oil | 1.0 |
| Dicalcium phosphate | 0.3 |
| Sodium chloride | 0.4 |
| Vitamin[a] and mineral[b] Premix | 1.0 |
| Total | 100.0 |
| Calculated and determined analysis | |
| Crude protein | 17.0 |
| Fat | 4.5 |
| Metabolizable energy, kcal/kg | 2800.0 |
| Total phosphate | 0.56 |
| Calcium | 4.2 |
| Lysine | 0.9 |
| Methionine | 0.45 |
| Methionine + Lysine | 0.77 |

[a]Vitamin premix supplied the followings per kg of basal diet: Vit. A, 12600 IU; Vit. D$_3$, 3000 ICU; Vit. E, 18 IU; Vit. K, 3.6 mg; riboflavin 6.6 mg; niacin, 40.8 mg; pantothenic acid, 14.4 mg; Vit. B$_{12}$, 0.012 mg; folic acid, 0.6 mg; pyridoxine, 1.2 mg.
[b]Mineral premix supplied the followings per kg of basal diet: Mn, 31 mg; Cu, 7.1 mg; Zn, 44.8 mg; Fe, 20 mg.

The analytic methods are described as follows.

(1) Preparation of Analysis Samples

Egg : stored at room temperature for 24 hours

Pretreatment: egg weighed→broken out yolk separated→yolk taken→rolled across moistened paper towel to remove the chalazae and any adhering albumen→placed into a plastic cup→yolk material separated from the vitelline membrane (vitelline membrane discarded)→yolk solution→weighed→homogenized→ready for analysis (2) Analysis of Cholesterol Concentration in Yolk The cholesterol concentration in yolk is determined by weighing 0.5 g homogenized yolk solution, adding a solution of KOH in alcohol (9.4 mL 95% $C_2H_5OH$ and 0.6 mL 33% KOH) into the homogenized yolk solution, and directly saponified in a water bath at 60° C. for 1 hour. Thereafter, the unsaponified portion on the top layer is extracted with 10 mL n-hexane for analysis of cholesterol concentration in yolk.

1 mL of cholesterol enzyme reactive reagent was added into 0.01 mL of n-hexane extract. The reactants were stirred in a water bath at 37° C. for 15 min. The reaction mixture was then removed and the absorbance at a wavelength of 500 nm was analyzed for cholesterol concentration by a spectrophotometer. At this time, 0.01 mL of deionized water is used as blank.

(3) Analyses of Serum Cholesterol, Triglyceride, HDL, LDL

Each treatment group includes 12 hens. 2–3 ml blood samples were collected from the vein on the brachial wing of individual hen, centrifuged at 3,000×g for 10 min, and serum is separated and stored at −20° C. for analysis. After the serum collected for each treatment group is fully reacted with a commercial diagnostic kits, the cholesterol, triglyc-

TABLE 2

Effect of red mold rice on laying hen performance egg quality

| Red mold rice (%) | Monacolin K content (%) | Specific gravity | Shell weight (g) | Shell thickness (mm) | Shell strength (g/cm$^2$) | Yolk color score |
|---|---|---|---|---|---|---|
| 0 | 0 | 1.0855 ± 0.0032[a] | 5.77 ± 0.13[ab] | 0.433 ± 0.012[a] | 4099 ± 234[a] | 6.90 ± 0.18[a] |
| 2.0 | 0.014 | 1.0889 ± 0.0022[a] | 5.72 ± 0.20[a] | 0.439 ± 0.009[a] | 3878 ± 215[ab] | 7.11 ± 0.18[ab] |
| 5.0 | 0.035 | 1.0876 ± 0.0030[a] | 5.92 ± 0.07[ab] | 0.438 ± 0.013[a] | 3583 ± 251[b] | 7.38 ± 0.21[b] |
| 8.0 | 0.056 | 1.0875 ± 0.0044[a] | 5.96 ± 0.13[b] | 0.441 ± 0.006[a] | 3698 ± 180[b] | 8.02 ± 0.15[c] |

The duration of the experiment was 42 days. Data are presented as means ± SD. Mean values of duplicate analyses of 18 eggs in each diets. Mean values within each column with different superscripts are significantly different (p ≤ 0.05).

2. Performance of Egg Quality (1) Determination of eggshell thickness—Egg shell samples were randomly taken from three locations (air cell, equator, and sharp end) using a micrometer gauge to determine eggshell thickness.

(2) Determination of eggshell strength—Eggs shell strength was determined by using the puncture method suggested by Carter et al. (Texture Analyzer, Stable Micro SystemTA-XT2i).

(3) Determination of specific gravity—Specific gravity of eggs was determined by using the saline flotation method proposed by Hamilton et al. Salt solutions were prepared in incremental concentration of 0.005 in the range from 1.065 to 1.110.

(4) Determination of yolk color—Yolk color (1, light yellow; 15, orange) was measured by the Roche color fan.

eride, LDL and HDL concentration were determined by a bio-analytical equipment MIRA-plus provided by Cobas Mira.

(4) Analyses of Serum Lipid Peroxidation (TBARS Assay)

In the TBARS assay, 500 μL of serum was well mixed with 3 mL of 5% trichloroacetic acid and 1 mL of freshly prepared 60 mmol/L thiobarbituric acid (TBA). After incubation at 80° C. for 90 min, the samples were cooled at room temperature, and then centrifuged for 15 min at 4° C. The absorbance is read at 535 nm by a spectrophotometer and then the inhibition rate to serum lipid peroxidation is calculated as follows.

Inhibition rate (%)=[1−(serum TBARS value of red mold rice treatment/serum TBARS value of control treatment)]× 100

(5) Measurement of Monacolin K in Hens Feed Through HPLC Analysis 1 gram of red mold rice is weighed, and 5 mL of ethyl acetate is added into the red mold rice. The resulted mixture is heated in a water bath at 70° C. for 1.5 hours. After be extracted, the supernatant (ethyl acetate) is evaporated in an air-removal cabinet to dryness, dissolved with equal amount of acetonitrile, filtered by means of a 0.45 μm filter membrane and analyzed according to HPLC (High Performance Liquid Chromatography).

The operating conditions for performing HPLC analysis were described as follows.

Column used: Beckman Ultrasphere ODS (150×4.6 mm)
Guard column: Beckman Ultrasphere ODS (45×4.6 mm)
Moving phase: acetonitrile: $H_2O$=72:28
Flow rate: 0.5 mL/min
UV detector (detection wavelength=238 nm)
Retention time: approximately 6.7 min (6) Determination of Monacolin K residue remained in eggs The method for determining whether there is any monacolin K residue remained comprised the following steps. 20 mL acetonitrile-water (9:1, v/v) is added into 10 grams of egg samples (including yolk samples and albumen samples which are separated from eggs laid by hens fed with red mold rice of the highest content for 42 days), vibrated for 60 min through ultrasonic vibration, stirred and mixed for 15 min. Then, after the solid is separated off through a Whatman No. 1 filter paper, equal volume of acetonitrile is added into a 4 mL egg sample, filtered via a filter membrane of 0.45 μm pore size, and analyzed thgrough HPLC. The operating conditions for performing HPLC analysis were described as above.

All data obtained in the experiment were subjected to analysis of variance (ANOVA), post-hoc analyses were carried out with a General Linear Model Procedure (GLM) by using the Duncan's test for multiple comparisons. Statement of statistical significance were based on $p<0.05$. These analyses were accomplished by using statistical analyses configured for computer (SPSS, Release 9.0, SPPS. Inc).

Table 2 shows items analyzed. The results showed that the content level of red mold rice had no significant effect on specific gravity and shell thickness. Addition of 8% red mold rice showed significant difference in shell weight. On the contrary, the addition of 2.0% red mold rice showed lower shell weight but there is no significant difference in shell weight comparing to other groups. Addition of 5.0% red mold rice showed lowest shell strength and had significant difference comparing to other groups. The data indicated that addition of red mold rice seems to reduce shell strength. Yolk color score showed that the darkest color happened when 8.0% of red mold rice was incorporated into the feed, and the lightest yolk color was in the control group.

Effect of red mold rice content in hens diet on body weight, egg production, egg weight, yolk weight, feed consumption and feed conversion is shown in Table 3. Addition of 8.0% red mold rice had significant difference in body weight loss. The hens showed significant loss of body weight before and after the experiment. The average body weight losses are 15.8 g, 7.5 g, 46.2 g and 29.0 g for the groups with addition of 2.0%, 5.0%, 8.0% red mold rice and the control group, respectively. Addition of appropriate amount of red mold rice in the feed diets can influence change of egg weight: These groups showed no significant difference in egg production. The group feeding with 2.0% red mold rice showed the lightest egg weight, which was significantly different from that of other groups. Yolk weight had no significant difference across groups. Feed consumption increased by 2–8% as the content of red mold rice increased. Feed conversion increased by 6–14% depending on the red mold rice content.

The degree of reduction on egg cholesterol varied with the content of red mold rice in the feed. Egg cholesterol of control group is 11.77 mg/g of yolk or 194.14 mg/egg. After six weeks of feeding, all groups had significant difference in reduction of cholesterol. The group fed with 2.0% red mold rice showed maximum reduction of cholesterol by 13.89%, and the cholesterol concentration was found to be 10.46 mg/g of yolk or 167.17 mg/egg. In addition, the cholesterol reduction was 12.98% and 5.73% for 5.0% red mold rice and 8.0% red mold rice diets, respectively. Based on the data, addition of red mold rice in feed diets did help on reducing egg cholesterol concentration.

Addition of red mold rice can effectively reduce LDL, and the addition of 8.0% of red mold rice to the diet can significantly reduce LDL by 21%, which was significantly different from that of other groups. All groups had no significant difference in HDL. All groups had significant difference in triglyceride. Triglyceride analysis showed that the triglyceride is significantly reduced by about 20% when 5.0% red mold rice was incorporated to feed diets. All groups had significant difference in serum cholesterol, and the addition of 5.0% of red mold rice to the diet can significantly reduce serum cholesterol by 19.35%. The result also indicated that the red mold rice increases ratios of HDL over cholesterol and HDL over LDL.

Figure 2:
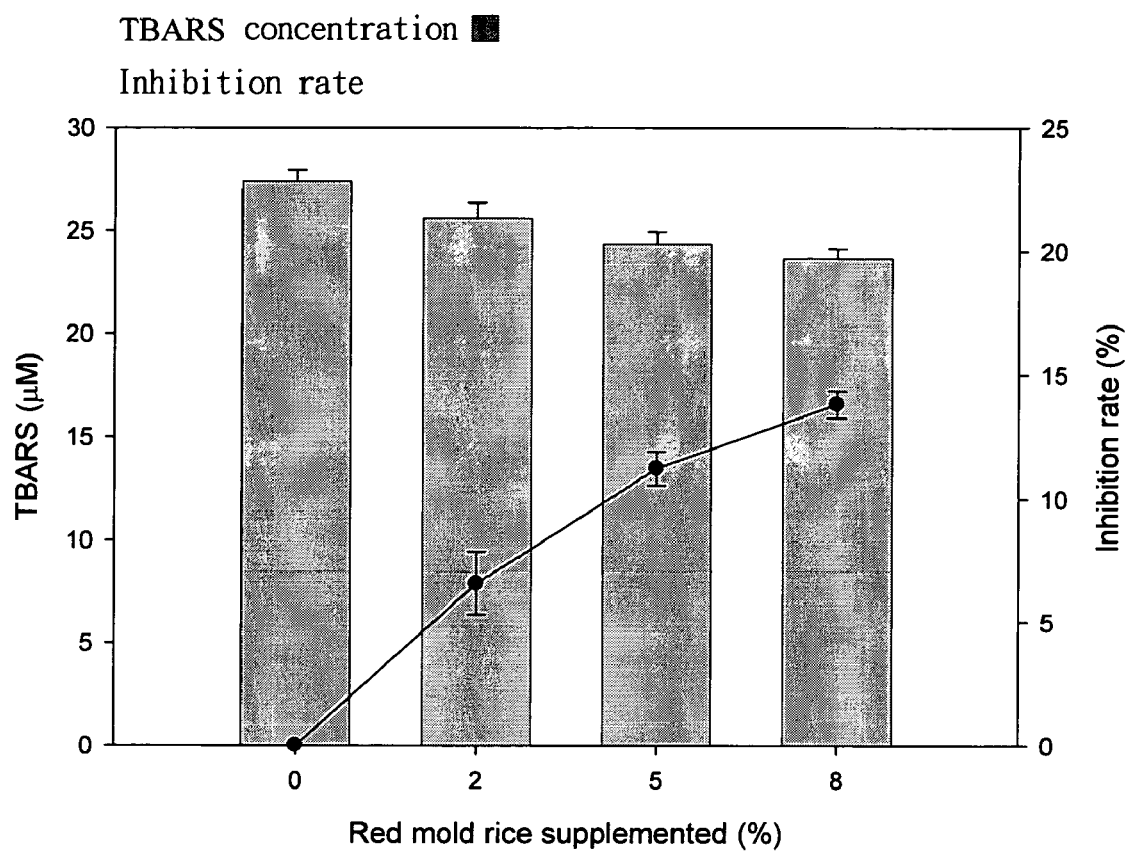
FIG. 2 is a relation diagram illustrating effects of red mold rice supplementation on TBARS levels and serum lipid peroxidation inhibition rate.

Malondialdehyde (MDA) is a byproduct of lipid peroxidation. When reacted with thiobarbituric acid (TBA), a red compound named MDA-TBA (TBARS) would be produced. TBARS has maximum absorption under wavelength of 532 nm, and is positively correlated to MDA. As shown in FIG. 2, TBARS concentration was tested after 6 weeks of feeding red mold rice added. Red mold rice showed 6–14% inhibition rate to serum lipid peroxidation, and it is proved that red mold rice can reduce lipid peroxidation in serum.

Figure 3:
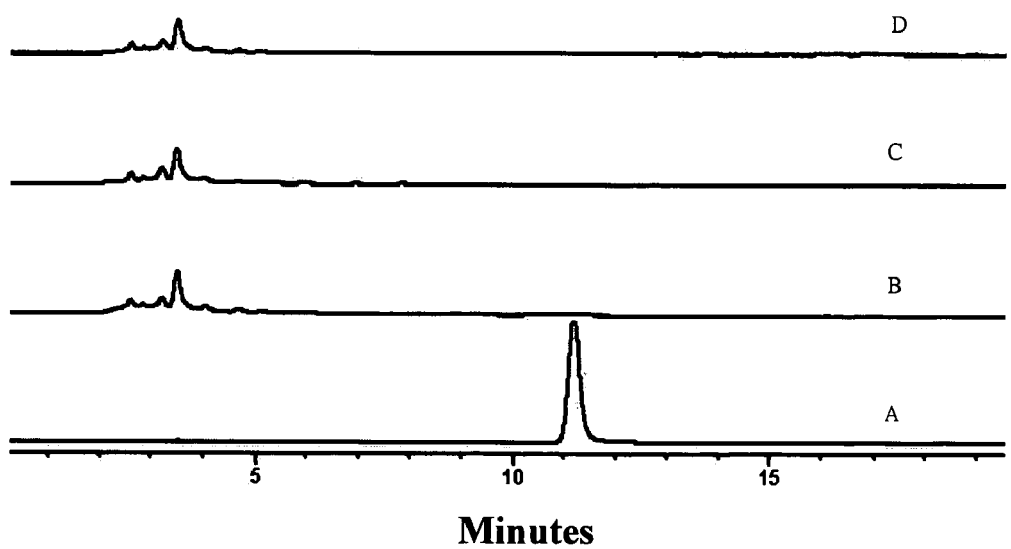
FIG. 3 is a HPLC analysis diagram of monacolin K in hens.

As shown in FIG. 3, the HPLC spectrum of A showed that the retention time of monacolin K was 11 min, and the HPLC spectrum of B showed that no substance was found at the retention time of 11 min for the yolk from hens fed with basal diet containing no monacolin K and extracted with acetonitrile. The C and D are HPLC spectra of yolk and egg white from hens fed with basal diet containing 0.056% monacolin K and extracted with acetonitrile, respectively. These results showed that no substance was found at the retention time of 11 min. In other word, there was no monacolin K residue or shift found in eggs. Since red mold rice can effectively lower cholesterol and do no harm when remained, it is safe to add red mold rice into feed diets.

Yolk color is one of the crucial factor during evaluation and was determined by the variation of pigment in oxycarotenoids. However, the factors that influence egg yolk color include genetics, diets, and environmental systems. Furthermore, addition of antioxidants had synergistic effect on improving egg yolk color. *Monascus* has been known as an edible pigment, and the antioxidative property of *Monascus* species had been verified in our previous studies. Therefore, the addition of red mold rice in hens diet proved to exhibit positive effect on yolk color as the experimental groups show 3–16% increase of yolk color when compared to the control group. As far as eggshell quality is concerned, although red mold rice can increase shell weight, it seems to exhibit very little effect on shell strength. Whether red mold rice has effect on the use of calcium in hens body, which, in turn, affect shell strength need to be investigated in further research. Groups that received red mold rice showed higher daily feed consumption and feed conversion than the control group. However, the egg production for all the groups that received red mold rice were almost the same, and the difference lies on the egg size only.

Furthermore, some researches showed that atherosclerosis is not only correlated to cholesterol and LDL in blood, but also correlated to the oxidation of LDL. Chen et al. pointed out that antioxidant ability and cardiovascular diseases were closely related. Aviram et al. argued that lovastatin had special chemical composition; it was easier to react with metal ions to produce coordination compounds. In other words, lovastatin was an antioxidant and could inhibit lipid peroxidation. Aviram et al. also pointed out that in oxidation of LDL, decreasing the TBARS concentration of lovastatin was related to lasting time and dose of lovastatin.

As a matter of fact, production of monacolin K by *Monascus* species has been used as a functional dietary supplement to reduce cholesterol level in human body. To our knowledge, the effect of red mold rice on eggs has yet to be investigated in previous studies. Jeon et al. pointed out that lovastatin not only can significantly reduce hepatic CAT activity, but also reduce peroxidation of lipid in plasmas and liver. This embodiment showed that antioxidant ability of serum can be significantly increased by red mold rice, and proved that red mold rice could increase antioxidant ability in laying hens.

The result shown in Table 4 indicated that the addition of 2.0, 5.0 and 8.0% red mold rice to hens diet could reduce serum cholesterol by 8.35%, 19.35% and 10.93%, respectively, reduce triglyceride concentration by 14.32%, 20.41% and 7.56%, respectively, and reduce LDL concentration by 12.39%, 18.34% and 21.37% respectively. The addition of 2.0%, 5.0% and 8.0% of red mold rice can reduce LDL by 12.39%, 18.34% 及 and 1.37%, respectively. Comparing to hypocholesterolemic agents in humans, red mold rice showed similar function in reducing cholesterol, trglyceride, HDL, and LDL in laying hens. Pitman et al. pointed out that Monacolin K (lactone of lovastatin) contained in red mold rice could inhibit activity of HMG-CoA reductase and increase activity of LDL receptor. Therefore, it could strength direct absorption of VLDL to liver, and reduced the amount of VLDL transformed to LDL to achieve the goal of cholesterol reduction. As far as HDL was concerned, HDL showed no significant change when red mold rice was added to hens diet, and showed slight decreases at high concentration of monacolin K. When compared ratios of HDL/LDL and HDL/cholesterol, it was found that groups receiving red mold rice diets showed higher level (HDL/LDL, 16.1~10.7%; HDL/cholesterol, 0%~14.6%). Furthermore, the cholesterol level and the ratio of HDL/LDL in eggs have different results. As shown from the experimental data, serum HDL and LDL were correlated to the addition of red mold rice. In other words, the addition of red mold rice is positively correlated to reduction of the serum HDL and LDL. However, the reduction of cholesterol level was not correlated to the addition of red mold rice, but correlated to the ratio of HDL/LDL. The cholesterol level in eggs was reduced as the ratio of HDL/LDL was increased. Therefore, controlling the ratio of HDL/LDL is critical for reducing cholesterol level in eggs.

In this embodiment, the reduction of cholesterol level was not completely correlated to the addition of red mold rice. Cholesterol is an essential to the biosynthesis of hormone and can maintain certain level of egg production. Other substances may effectively reduce biosynthesis of hormone or limit cholesterol level in eggs. However, a certain cholesterol level is necessary for physiological functions in bodies.

Based on above embodiment, it is reasonable to conclude that incorporation of red mold rice to human diets can be advantageous as health care food, and incorporation of red mold rice to hens diets can reduce egg cholesterol concentration, serum cholesterol, triglyceride, and LDL concentration.

The process for producing eggs with low cholesterol level according to the present invention, when comparing with other previous conventional technologies, has following advantages:

1. The yolk color is increased.
2. The antioxidant ability in the bodies of laying hens is increased.
3. The blood cholesterol level of laying hens is reduced.
4. The serum triglyceride level of laying hens is reduced.
5. The yolk cholesterol level can be reduced by controlling the ratio of HDL/LDL in serum.
6. No monacolin K residue was found according to the process of the present invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

TABLE 3

Effect of red mold rice on laying hen performance

| Red mold rice (%) | Monacolin K content (%) | Body weight change (g)[b] | Egg production (%)[b] | Egg weight (g)[c] | Yolk weight (g/egg)[c] | Egg cholesterol (mg/egg)[c] | Feed consumption (g/hen/day)[d] | Feed conversion (kg feed/kg egg) [d] |
|---|---|---|---|---|---|---|---|---|
| 0 | 0 | −29.0 | 80.93 ± 3.23[a] | 64.86 ± 0.81[a] | 16.49 ± 0.48[a] | 194.14 ± 8.30[a] | 89.84 ± 2.15[a] | 1.726 ± 0.032[a] |
| 2.0 | 0.014 | −15.8 | 77.77 ± 2.72[ab] | 61.51 ± 1.53[b] | 15.97 ± 0.83[a] | 167.17 ± 4.34[b] | 91.72 ± 1.91[ab] | 1.932 ± 0.025[b] |
| 5.0 | 0.035 | −7.5 | 80.31 ± 2.90[ab] | 65.51 ± 0.90[a] | 16.55 ± 0.83[a] | 168.93 ± 9.38[b] | 94.43 ± 2.11[bc] | 1.826 ± 0.019[c] |
| 8.0 | 0.056 | −46.2 | 76.96 ± 1.66[b] | 65.14 ± 1.31[a] | 16.77 ± 0.57[a] | 183.02 ± 7.63[ab] | 97.17 ± 1.82[c] | 1.968 ± 0.055[b] |

[a]The duration of the experiment was 42 days. Data are presented as means ± SD. Mean values within each column with different superscripts are significantly different ($p \leq 0.05$).
[b]Mean values of beginning and the end of the study (12 hens/diet).
[c]Mean value of 18 eggs in each diets.
[e]Mean value of 12 hens per diets

TABLE 4

Effect of red mold rice on laying hen performance serum LDL, HDL, triglyceride, cholesterol.

| Red mold rice (%) | Monacolin K Content (%) | Items (mg/dL) | | | | Ratios | |
|---|---|---|---|---|---|---|---|
| | | LDL | HDL | Triglyceride | Cholesterol | HDL/Cholesterol. | HDL/LDL |
| 0 | 0 | 36.81 ± 5.53[a] | 36.06 ± 3.96[a] | 1494 ± 178[a] | 141.66 ± 9.50[a] | 0.254 ± 0.013[a] | 0.987 ± 0.079[a] |
| 2.0 | 0.014 | 32.25 ± 7.93[ab] | 36.25 ± 5.39[a] | 1280 ± 174[ab] | 129.83 ± 13.18[ab] | 0.278 ± 0.021[b] | 1.146 ± 0.114[b] |
| 5.0 | 0.035 | 30.06 ± 4.39[ab] | 33.13 ± 3.68[a] | 1189 ± 248[b] | 114.25 ± 16.43[b] | 0.291 ± 0.015[b] | 1.107 ± 0.053[b] |
| 8.0 | 0.056 | 28.81 ± 4.16[b] | 31.44 ± 4.29[a] | 1381 ± 218[ab] | 126.17 ± 19.75[ab] | 0.250 ± 0.012[a] | 1.093 ± 0.079[ab] |

The duration of the experiment was 42 days. Data are presented as means ± SD (n = 12). Mean values within each column with different superscripts are significantly different ($p \leq 0.05$).

What is claimed is:

1. A process for producing eggs having a cholesterol level less than 194.14 mg/egg, including the steps of:
   (a) cooking a rice, and after an autoclaved treatment, cooling down said rice to a cooling temperature;
   (b) inoculating a *Monascus* species into said rice;
   (c) spraying water onto said rice at a temperature approximately 30° C., stirring said rice, and after an incubation period, fermenting said rice with said *Monascus* species thereby forming a red mold rice;
   (d) adding said fermented red mold rice at a specific proportion into a feed for hens; and
   (e) feeding hens an effective amount of said feed comprising said red mold rice for a time period sufficient to produce eggs having said cholesterol level.

2. The process for producing eggs with low cholesterol level according to claim 1, wherein said rice is a long-grain rice.

3. The process for producing eggs with low cholesterol level according to claim 1, wherein said cooling temperature is 40° C.

4. The process for producing eggs with low cholesterol level according to claim 1, wherein said feed consists of corn, soybean meal, meat meal, bone meal, fish meal, corn gluten meal, wheat bran, limestone, oyster, oil, dicalcium, phosphate, sodium chloride, vitamin or mineral.

5. The process for producing eggs with low cholesterol level according to claim 1, wherein said incubation temperature is 30° C.

6. The process for producing eggs with low cholesterol level according to claim 1, wherein said incubation period is 10 days.

7. The process for producing eggs with low cholesterol level according to claim 1, wherein monacolin K concentration of said red mold rice is 0.014~0.056% by weight.

8. The process for producing eggs with low cholesterol level according to claim 1, wherein said specific proportion of said fermented red mold rice added to feed diet is 2.0~8.0% by weight, which is determined by the rate of biosynthesis and hens body weight.

* * * * *